US012768094B2

(12) United States Patent
Zhao et al.

(10) Patent No.: US 12,768,094 B2
(45) Date of Patent: Oct. 20, 2026

(54) WASHING APPARATUS

(71) Applicants: QINGDAO HAIER LAUNDRY ELECTRIC APPLIANCES CO., LTD, Qingdao (CN); HAIER SMART HOME CO., LTD., Qingdao (CN)

(72) Inventors: Zhiqiang Zhao, Qingdao (CN); Sheng Xu, Qingdao (CN); Peishi Lv, Qingdao (CN)

(73) Assignees: QINGDAO HAIER LAUNDRY ELECTRIC APPLIANCES CO., LTD, Qingdao (CN); HAIER SMART HOME CO., LTD., Qingdao (CN)

( * ) Notice: Subject to any disclaimer, the term of this patent is extended or adjusted under 35 U.S.C. 154(b) by 119 days.

(21) Appl. No.: 18/855,084

(22) PCT Filed: Mar. 6, 2023

(86) PCT No.: PCT/CN2023/079810
§ 371 (c)(1),
(2) Date: Oct. 8, 2024

(87) PCT Pub. No.: WO2023/197778
PCT Pub. Date: Oct. 19, 2023

(65) Prior Publication Data

US 2025/0257516 A1 Aug. 14, 2025

(30) Foreign Application Priority Data

Apr. 12, 2022 (CN) ......................... 202210382893.5

(51) Int. Cl.
*D06F 39/08* (2006.01)
*D06F 23/02* (2006.01)
(Continued)

(52) U.S. Cl.
CPC .......... *D06F 39/083* (2013.01); *D06F 23/025* (2013.01); *D06F 37/065* (2013.01); *F16K 24/04* (2013.01)

(58) Field of Classification Search
CPC ..... D06F 39/083; D06F 23/025; D06F 37/065
See application file for complete search history.

(56) References Cited

FOREIGN PATENT DOCUMENTS

| | | | |
|---|---|---|---|
| CN | 2294279 | Y | 10/1998 |
| CN | 201028028 | Y | 2/2008 |

(Continued)

OTHER PUBLICATIONS

Machine Translation of Xu et al., WO-2020248959-A1, Dec. 2020. (Year: 2020).*

(Continued)

*Primary Examiner* — David G Cormier
(74) *Attorney, Agent, or Firm* — Maier & Maier, PLLC

(57) ABSTRACT

A washing apparatus to solve the problems in existing washing machines of a drain solenoid valve of a non-porous inner drum being prone to circuit failure and the requirement for the overall layout being excessively high. A drain valve group is configured such that a drain outlet can move and open merely under a centrifugal force generated by the rotation of a non-porous inner drum, without the need to electrically drive a valve core to move, so as to allow the non-porous inner drum to discharge water outwards, and the drain outlet can be reset and blocked under an elastic force, thus achieving no-power operation. When the drain valve group is configured on the non-porous inner drum, it is not necessary to consider the spatial layout and waterproofing of power elements and their circuits, reducing the drainage arrangement costs when the washing machine is equipped with a non-porous inner drum.

8 Claims, 2 Drawing Sheets

(51) Int. Cl.

| | |
|---|---|
| ***D06F 37/06*** | (2006.01) |
| ***F16K 24/04*** | (2006.01) |

(56) References Cited

FOREIGN PATENT DOCUMENTS

| | | | | | |
|---|---|---|---|---|---|
| CN | 104452184 | A | | 3/2015 | |
| CN | 109423801 | A | | 3/2019 | |
| CN | 110195331 | A | | 9/2019 | |
| CN | 111691128 | A | | 9/2020 | |
| CN | 111764115 | A | | 10/2020 | |
| CN | 213267171 | U | | 5/2021 | |
| CN | 113915609 | A | | 1/2022 | |
| CN | 114517384 | A | | 5/2022 | |
| CN | 115450016 | A | | 12/2022 | |
| JP | 08155190 | A | | 6/1996 | |
| WO | WO 02/04734 | A1 | | 1/2002 | |
| WO | WO-2020248959 | A1 | * | 12/2020 | ............. D06F 39/04 |

OTHER PUBLICATIONS

Office Action issued on Jun. 21, 2025, in corresponding Chinese Application No. 202210382893.5, 13 pages.

International Search Report issued on May 24, 2023, in corresponding International Application No. PCT/CN2023/079810, 7 pages.

Office Action issued on Mar. 20, 2026, in corresponding Chinese Application No. 202210382893.5, 8 pages.

Office Action issued on Oct. 23, 2025, in corresponding Chinese Application No. 202210382893.5, 10 pages.

Office Action issued on Dec. 30, 2025, in corresponding Chinese Application No. 202210382893.5, 12 pages.

* cited by examiner

WASHING APPARATUS

CROSS-REFERENCE TO RELATED APPLICATIONS

The present application claims priority from Chinese patent application No. CN202210382893.5 filed on Apr. 12, 2022 and entitled "WASHING APPARATUS", the entire disclosure of which is incorporated herein by reference.

FIELD

The present disclosure relates to the technical field of home appliance, and specifically provides a washing apparatus.

BACKGROUND

A washing drum of a washing machine is usually configured as a two-layer drum, namely, including an outer cylinder fixed inside a shell of the washing machine, and an inner cylinder provided inside the outer cylinder for water to pass through. A cylinder body of the outer cylinder is closed so that the outer cylinder can hold washing water, and the inner cylinder is provided with water passing holes and can contain clothing. The arrangement of the above cylinder structure requires the outer cylinder to hold the washing water for a long time at each time of clothing washing, making it very easy for dirt impurities carried in the washing water to remain on an inner wall of the outer cylinder. However, the inner wall of the outer cylinder is very difficult to be reliably cleaned due to the obstruction of the inner cylinder, which often leaves a large amount of dirt to breed bacteria between the outer cylinder and the inner cylinder of the washing machine after long-term use, thus deteriorating an internal hygiene environment of the washing machine.

In order to solve the above problems, the inner cylinders of some washing machines are currently configured to have a hole-free shape, and are provided with a drainage structure so that the washing water can be directly held by the above inner cylinders, without the need for the outer cylinders to assist in holding the washing water. In this case, a solenoid valve is usually provided at the position of the drainage structure so that the solenoid valve is controlled to be powered on and opened when the washing machine drains water, thus communicating the inner cylinder with the outside for achieving drainage. The disadvantage of the above-mentioned washing machines is that the solenoid valve requires a driving motor to provide power for it, and in the event of failure of the driving motor, the drainage need of the washing machines cannot be met. Therefore, in order to ensure the operation stability of the driving motor and the convenience of maintenance, the driving motor needs to have a waterproof function with high reliability, and it also needs to occupy a large arrangement space in the washing drum, imposing high requirements on overall arrangement.

Accordingly, there is a need for a new washing apparatus in the art to solve the above problems.

SUMMARY

The present disclosure aims to solve the above technical problems, namely, to solve the problems that the drainage solenoid valves in the hole-free inner cylinders of existing washing machines are prone to circuit failure, and the overall arrangement requirements are very high.

The present disclosure provides a washing apparatus, which includes an outer cylinder, a hole-free inner cylinder, a drainage valve group, and a drainage pipe group; the outer cylinder is communicated with the outside through the drainage pipe group, the hole-free inner cylinder is coaxially rotatably arranged inside the outer cylinder, and a drainage port is provided on a cylinder wall of the hole-free inner cylinder; the drainage valve group includes a connection assembly, an elastic member, and a valve core; the valve core is connected to the hole-free inner cylinder through the connection assembly and the elastic member respectively; the elastic member is configured to be capable of urging the valve core to maintain a state of blocking the drainage port in non-drainage situations, and to be capable of allowing the valve core to move away from the drainage port by means of a centrifugal force overcoming an elastic force through elastic deformation of the elastic member when the hole-free inner cylinder rotates for drainage, thereby opening the drainage port; the connection assembly is configured to be capable of guiding the valve core to move away from the drainage port in drainage situations, and to be capable of guiding the valve core to move for resetting through a springback action of the elastic member in non-drainage situations.

In a preferred technical solution of the washing apparatus described above, the connection assembly includes a connecting rod assembly, and the valve core is connected to the hole-free inner cylinder through the connecting rod assembly; the connecting rod assembly can guide the valve core to move away from the drainage port through expansion/retraction deformation, and can guide the valve core to move toward the drainage port through retraction/expansion deformation for resetting.

In a preferred technical solution of the washing apparatus described above, the connecting rod assembly is arranged inside the hole-free inner cylinder, and the connecting rod assembly includes two symmetrically arranged rod groups, each of which includes a first connecting rod and a second connecting rod that are pivotally connected; one end of the first connecting rod that is away from the second connecting rod of the same group is pivotally connected to an inner side of the hole-free inner cylinder, and one end of the second connecting rod that is away from the first connecting rod is pivotally connected to the valve core; in a case where the valve core moves away from the drainage port, an angle between the first connecting rod and the second connecting rod increases to guide the valve core to move toward the outside of the hole-free inner cylinder through expansion deformation; and in a case where the valve core moves for resetting, the angle between the first connecting rod and the second connecting rod decreases to guide the valve core to move toward the drainage port through retraction deformation for resetting.

In a preferred technical solution of the washing apparatus described above, the drainage valve group further includes a counterweight member, which is arranged on the connecting rod assembly for assisting in deformation movement of the connecting rod assembly under the action of centrifugal force when the hole-free inner cylinder rotates for drainage and thus urging the valve core to move away from the drainage port.

In a preferred technical solution of the washing apparatus described above, the drainage valve group further includes a counterweight member, which is arranged on the valve core for urging the valve core to move away from the drainage port under the action of centrifugal force when the hole-free inner cylinder rotates for drainage.

In a preferred technical solution of the washing apparatus described above, the elastic member is a spring arranged inside the hole-free inner cylinder, and two ends of the spring are connected to the hole-free inner cylinder and the valve core respectively, so that the spring can allow the valve core to move away from the drainage port through stretching deformation of the spring, and can urge the valve core to move for resetting through contracting and springing back of the spring.

In a preferred technical solution of the washing apparatus described above, a guide structure is provided on the hole-free inner cylinder, and the guide structure is aligned with the drainage port so that the valve core is guided to move in a state of being aligned with the drainage port.

In a preferred technical solution of the washing apparatus described above, an inner side wall of the hole-free inner cylinder is provided with a lifting rib, which includes a shell and water passing holes provided on the shell; the drainage port is arranged on the side wall of the hole-free inner cylinder and covered by the shell; the connection assembly, the elastic member, and the valve core are all arranged inside the shell, and the valve core is connected to an inner side of the side wall of the hole-free inner cylinder through the connection assembly and the elastic member respectively.

In a preferred technical solution of the washing apparatus described above, the lifting rib further includes an installation bracket, which is arranged inside the shell, and the connection assembly and the elastic member are connected to the hole-free inner cylinder through the installation bracket.

In a preferred technical solution of the washing apparatus described above, the valve core includes a valve core body and a sealing structure arranged on the valve core body, and the valve core blocks the drainage port through the sealing structure.

In a case where the above technical solutions are adopted, the drainage valve group of the present disclosure does not require electric power to drive the valve core to move. It is only required to rely on the centrifugal force generated by the rotation of the hole-free inner cylinder for drainage to move the valve core and open the drainage port, allowing the hole-free inner cylinder to discharge water to the outside. The valve core can also be reset to block the drainage port under the action of the elastic force, achieving non-powered operation. When configured on the hole-free inner cylinder, there is no need to consider the spatial arrangement and waterproof problems of power elements and power element circuits, reducing the drainage arrangement cost of the washing machine when setting the hole-free inner cylinder. Moreover, compared with electric power driving, the mechanically operated drainage valve group of the present disclosure has a lower failure rate, better working reliability, and easy installation.

Further, the above drainage valve group is connected to the valve core and the hole-free inner cylinder through a connecting rod assembly, so that the connecting rod assembly can install the valve core by allowing the valve core to move, and the movement direction of the valve core can be guided when it opens or closes the drainage port by means of the centrifugal force or the elastic force, preventing the valve core from getting stuck when it moves. The transmission structure is simple and stable, and the installation effect is good.

Further, the above drainage valve group also includes a counterweight member, which is arranged on the connecting rod assembly or the valve core to enhance the urging effect of the centrifugal force on the movement of the valve core and further optimize the smoothness of opening the valve core.

Further, the above drainage valve group is arranged inside the shell of the lifting rib, and the arrangement space of the drainage valve group and the arrangement space of the lifting rib are combined, optimizing the utilization of arrangement space of the hole-free inner cylinder. Moreover, the drainage valve group arranged on the inner side wall of the hole-free inner cylinder allows maintenance personnel to perform assembly/disassembly and maintenance operations directly from the internal space of the hole-free inner cylinder, the maintenance space is sufficient, and there is no need to disassemble the hole-free inner cylinder.

BRIEF DESCRIPTION OF DRAWINGS

Preferred embodiments of the present disclosure will be described below in connection with the accompanying drawings, in which.

DETAILED DESCRIPTION

It should be understood by those skilled in the art that the following embodiments are only used to explain the technical principle of the present disclosure, and are not intended to limit the scope of protection of the present disclosure. These embodiments can be adjusted by those skilled in the art as needed to adapt to specific application scenes. For example, although the washing apparatus of the present disclosure is described in connection with a drum washing machine, this is not limiting. Actually, the technical solutions of the present disclosure can be adopted by any washing apparatus with drainage requirement of hole-free inner cylinder, such as a washing-drying integrated machine, a dual-washing module apparatus, etc.

It should be noted that in the description of the present disclosure, terms indicating directional or positional relationships, such as “center”, “upper”, “lower”, “inner”, “outer” and the like, are based on the directional or positional relationships shown in the accompanying drawings. They are only used for ease of description, and do not indicate or imply that the device or element must have a specific orientation, or must be constructed or operated in a specific orientation; therefore, they should not be considered as limitations to the present disclosure. In addition, terms “first” and “second” are only used for descriptive purpose, and should not be understood as indicating or implying relative importance.

In addition, it should also be noted that in the description of the present disclosure, unless otherwise clearly specified and defined, terms “install”, “connect” and “connection” should be understood in a broad sense; for example, the connection may be a fixed connection, or a detachable connection, or an integral connection; it may be a direct connection, or an indirect connection implemented through an intermediate medium, or internal communication between two elements. For those skilled in the art, the specific meaning of the above terms in the present disclosure can be interpreted according to specific situations.

The technical solutions of the present disclosure will be described below using an example in which the washing apparatus is a drum washing machine.

Figure 1:
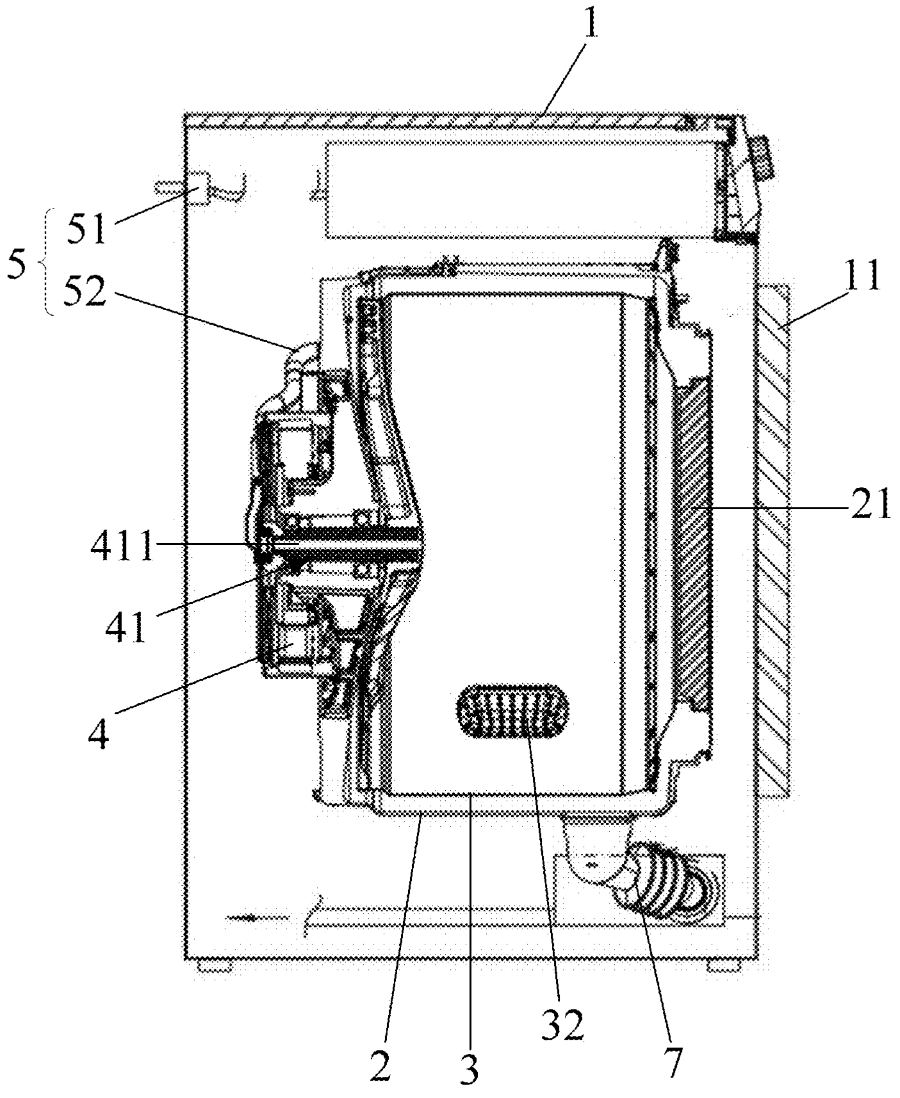
FIG. 1 is a schematic view of an overall structure of the washing apparatus of the present disclosure.
Figure 2:
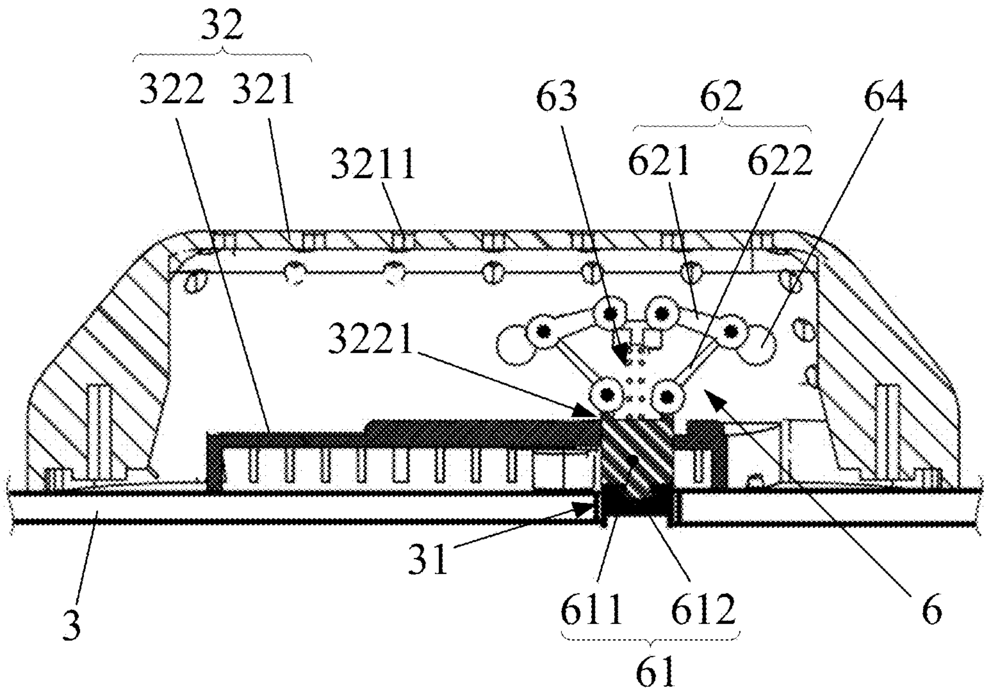
FIG. 2 is a schematic view of the structure of the drainage valve group of the washing apparatus of the present disclosure.

As shown in FIGS. 1-2, the drum washing machine of the present disclosure includes a housing 1, as well as a cylinder assembly, a water inflow assembly 5, a drainage valve group 6 and a drainage pipe 7 that are arranged inside the housing 1. The housing 1 is a of a cabinet structure, and a front side of the cabinet structure is provided with a clothing throw-in port and a door 11 that can open/close the clothing throw-in port. The cylinder assembly includes an outer cylinder 2 fixed inside the cabinet and a hole-free inner cylinder 3 coaxially rotatably arranged inside the outer cylinder 2. The outer cylinder 2 is horizontally installed inside the housing 1 with a cylinder opening thereof facing forward and aligned with the clothing throw-in port. An inner cylinder door 21 that can close the hole-free inner cylinder 3 is installed at the position of the cylinder opening of the outer cylinder 2. When the inner cylinder door 21 is closed, a cylinder opening of the hole-free inner cylinder 3 is reliably blocked. A driving motor 4 used to drive the hole-free inner cylinder 3 to rotate is arranged on an outer side of the bottom center of the outer cylinder 2. A driving end of the driving motor 4 is connected to a transmission shaft 41, which extends into the outer cylinder 2 and is connected to a rotation center position at the bottom of the hole-free inner cylinder 3, so as to transmit the torque of the driving motor 4 to the hole-free inner cylinder 3 and therefore drive the hole-free inner cylinder 3 to rotate. The hole-free inner cylinder 3 is provided with a water inlet for water inflow and a drainage port 31 for drainage. The water inflow assembly 5 can communicate an introducing end of external water source with the water inlet to introduce water into the hole-free inner cylinder 3. For example, the water inflow assembly 5 includes a water inflow pipe 52 and a water inflow valve 51 arranged on the water inflow pipe 52. A water inflow structure 411 is provided at an internal axis center position of the transmission shaft 41, and the water inflow structure 411 can form a water guide passage inside the shaft along the axis of the transmission shaft 41. A water outflow end of the water inflow structure 411 is communicated with the water inlet, and a water inflow end of the water inflow structure 411 is communicated with a water outflow end of the water inflow pipe 52. A water inflow end of the water inflow pipe 52 is communicated with the introducing end of external water source, so that the drum washing machine can introduce water into the hole-free inner cylinder 3 through the water inflow pipe 52 and the water inflow structure 411. A water inflow end of the drainage pipe 7 is communicated with the interior of the outer cylinder 2, and a water outflow end of the drainage pipe 7 is communicated with the outside. The drainage port 31 can communicate the interior of the hole-free inner cylinder 3 with the interior of the outer cylinder 2, allowing the washing water in the hole-free inner cylinder 3 to be discharged to the outside through the drainage pipe 7.

In order that the hole-free inner cylinder 3 opens the drainage port 31 only in drainage situations (such as washing drainage, rinsing drainage, or cylinder cleaning drainage) and closes the drainage port 31 in non-drainage situations (such as prewashing, washing, or rinsing), the above drainage valve group 6 is arranged at the position of the drainage port 31 on the hole-free inner cylinder 3. The drainage valve group 6 specifically includes a connection assembly 62, an elastic member 63, and a valve core 61. The shape of the valve core 61 matches the shape of the drainage port 31, so that the valve core 61 can block the drainage port 31 by staying at an orifice end of the drainage port 31 or by at least partially entering the drainage port 31, and the valve core 61 is connected to the hole-free inner cylinder 3 through the connection assembly 62 and the elastic member 63 respectively. The elastic member 63 is configured to be capable of urging the valve core 61 to maintain a state of blocking the drainage port 31 in non-drainage situations, and to be capable of allowing the valve core 61 to move away from the drainage port 31 by means of a centrifugal force overcoming an elastic force through elastic deformation of the elastic member 63 when the hole-free inner cylinder 3 rotates for drainage, thereby opening the drainage port 31. The connection assembly 62 is configured to be capable of guiding the valve core 61 to move away from the drainage port 31 in drainage situations, and to be capable of guiding the valve core 61 to move for resetting through a springback action of the elastic member 63 in non-drainage situations, so that the valve core 61 can move back to the position where the drainage port 31 can be blocked in non-drainage situations. The rotation for drainage of the hole-free inner cylinder 3 specifically refers to the rotation of the hole-free inner cylinder 3 at a set speed higher than the washing speed. When the hole-free inner cylinder 3 rotates at this set speed, it can generate a centrifugal force that urges the valve core 61 to overcome the elastic force of the elastic member 63 and move away from the drainage port 31. Those skilled in the art can adjust the specific speed value of the set speed according to the driving environment of the hole-free inner cylinder 3 and the requirements of rotation for drainage, as long as the centrifugal force generated when the hole-free inner cylinder 3 rotates at the set speed can urge the valve core 61 to move away from the drainage port 31 to open the drainage port 31 and maintain the open state of the drainage port 31.

Based on the above structure, when water is introduced into the drum washing machine, in non-drainage situations, the hole-free inner cylinder 3 rotates at a speed lower than the above set speed according to the working conditions. For example, in washing situation, the hole-free inner cylinder 3 rotates in forward and reverse directions repeatedly at a washing speed lower than the set speed; in this process, the elastic member 63 can support the valve core 61 to maintain a state of blocking the drainage port 31, so as to prevent washing water from flowing out of the hole-free inner cylinder 3.

During the drainage process (such as after clothing washing/rinsing and entering the spinning process), the hole-free inner cylinder 3 rotates continuously at a set speed, so that the centrifugal force generated can urge the valve core 61 to overcome the elastic force and move away from the drainage port 31, thereby opening the drainage port 31. This allows the hole-free inner cylinder 3 to be communicated with the outer cylinder 2 through the drainage port 31, and then the washing water in the hole-free inner cylinder 3 is discharged through the drainage pipe 7. The elastic member 63 is driven by the moving valve core 61 and stretched or compressed to deform.

After the drainage is completed, the hole-free inner cylinder 3 stops rotating or rotates at a speed lower than the set speed, and the centrifugal force decreases or disappears. The action of the elastic member 63 restoring elastic deformation urges the valve core 61 to be driven to move closer to the drainage port 31 and block the drainage port 31 again.

When the valve core 61 moves away from or close to the drainage port 31, the connection assembly 62 can restrict the valve core 61 so that the valve core 61 moves along a set path, thus urging the valve core 61 to maintain a state of being basically aligned with the drainage port 31 when moving under the action of centrifugal force or elastic force, and preventing the valve core 61 from not being aligned with the drainage port 31 when moving to open or block the drainage port 31, which would otherwise result in blockage failure or unsmooth movement due to friction interference with other components.

In the above embodiment, the movement of the valve core 61 away from the drainage port 31 specifically refers to the movement of the valve core 61 toward the outside of the hole-free inner cylinder 3 (i.e., in a direction approaching an inner side wall of the outer cylinder 2) through the drainage port 31 in the urging direction of centrifugal force. In a case where the requirements for urging the movement, resetting, and guiding the movement of the valve core 61 can be met, the arrangement positions of the connection assembly 62 and the elastic member 63 on the hole-free inner cylinder 3 are not limited. The elastic member 63 and the connection assembly 62 can be arranged such that either of them is located inside the hole-free inner cylinder 3, and the other is located between the hole-free inner cylinder 3 and the outer cylinder 2, or both of them are located inside the hole-free inner cylinder 3, or both of them are located between the hole-free inner cylinder 3 and the outer cylinder 2. Those skilled in the art can set the specific arrangement positions of the connection assembly 62 and the elastic member 63 based on the requirements for spacing setting between side walls of the hole-free inner cylinder 3 and the outer cylinder 2, the arrangement requirements for the cylinder assembly, and the movement and resetting requirements for the valve core 61, etc.

In a possible embodiment, the above connection assembly 62 includes a connecting rod assembly, and the valve core 61 is connected to the hole-free inner cylinder 3 through the connecting rod assembly. The connecting rod assembly can guide the valve core 61 to move away from the drainage port 31 through expansion/retraction deformation, and can guide the valve core 61 to move close to the drainage port 31 for resetting through retraction/expansion deformation.

With continued reference to FIG. 2, as an example, the above connecting rod assembly and elastic member 63 are both provided inside the hole-free inner cylinder 3. The connecting rod assembly includes two symmetrically arranged rod groups. According to the orientation shown in FIG. 2, when the drainage port 31 is arranged in the vertical orientation as shown in the figure, the two rod groups are arranged symmetrically left and right with respect to the valve core 61. Each rod group includes a first connecting rod 621 and a second connecting rod 622 that are pivotally connected. One end of the first connecting rod 621 that is away from the second connecting rod 622 of the same group is pivotally connected to an inner side of the hole-free inner cylinder 3, and one end of the second connecting rod 622 of the same group that is away from the first connecting rod 621 connected to the second connecting rod 622 is pivotally connected to the valve core 61. In the connected state, there is an angle between the first connecting rod 621 and the second connecting rod 622 of each group when the valve core 61 blocks the position of the drainage port 31, and the first connecting rod 621 and the second connecting rod 622 are in an unexpanded state. The above elastic member 63 is a spring provided inside the hole-free inner cylinder 3. The spring is preferably arranged in the middle of a side end of the valve core 61, and located between the two rod groups. Two ends of the spring are connected to the inner side of the hole-free inner cylinder 3 and the valve core 61 respectively, so that the elastic force of the spring can be uniformly transmitted to the valve core 61 in an unbiased manner, preventing the valve core 61 from being driven by the spring to deviate from the drainage port 31.

In non-drainage situations, the valve core 61 blocks inside the drainage port 31, and the spring is in a natural state and supports the valve core 61 to maintain its blocking position (i.e., the arrangement shown in FIG. 2). Alternatively, the valve core 61 blocks the position of the drainage port 31 by being snap-fitted on the water outflow side of the drainage port 31; the spring is stretched and deformed, and then the tendency to contract and spring back urges the valve core 61 to maintain its snap-fit and blocking position. In this situation, there is an angle between the first connecting rod 621 and the second connecting rod 622 of each rod group, and the first connecting rod 621 and the second connecting rod 622 are in an unexpanded state.

In drainage situations, the hole-free inner cylinder 3 rotates for drainage, and generates a centrifugal force that urges the valve core 61 to move outward away from the drainage port 31. Under the action of centrifugal force, the valve core 61 overcomes the elastic force of the spring and moves outward. The spring allows the valve core 61 to move away from the drainage port 31 due to stretching and deformation of the spring. The first connecting rod 621 and the second connecting rod 622 of each rod group are expanded and deformed, and the angle between the first connecting rod 621 and the second connecting rod 622 of each rod group increases to guide the valve core 61 to move outward away from the drainage port 31.

When drainage is completed, the hole-free inner cylinder 3 completes the action of rotating for drainage, and the centrifugal force decreases or disappears. The spring springs backs and urges the valve core 61 to move close to the drainage port 31 for resetting. The angle between the first connecting rod 621 and the second connecting rod 622 of each rod group decreases, so that by retraction deformation of the first connecting rod 621 and the second connecting rod 622, the valve core 61 is guided to be aligned with the drainage port 31, and the valve core 61 moves and resets to the position where the drainage port 31 can be blocked again.

As shown in FIG. 2, further, an inner side wall of the hole-free inner cylinder 3 is provided with a lifting rib 32 that is raised toward the interior of the cylinder. The lifting rib 32 includes a shell 321 connected to the inner side wall of the hole-free inner cylinder 3, and water passing holes 3211 provided on a shell wall of the shell 321. The water passing holes 3211 enables a cavity inside the shell 321 to be communicated with the outside, allowing the washing water of the hole-free inner cylinder 3 to enter the shell 321 through the water passing holes 3211. The above drainage port 31 is arranged on the side wall of the hole-free inner cylinder 3 and is covered by the shell 321. The rod groups, the spring and the valve core 61 described above are all arranged inside the shell 321, so that the shell 321 separates the connecting rod assembly and the spring from a washing space inside the hole-free inner cylinder 3. The above lifting rib 32 also includes an installation bracket 322, which is provided inside the shell 321 and connected to the shell 321 and/or the hole-free inner cylinder 3. The first connecting rod 621 and the spring described above are respectively connected to the inner side wall of the hole-free inner cylinder 3 through the installation bracket 322, so that the lifting rib 32 and the drainage valve group 6 are integrated, facilitating maintenance personnel to disassemble the shell 321 or the whole lifting rib 32 according to maintenance needs to inspect the drainage valve group 6.

Further, the hole-free inner cylinder 3 is provided with a guide structure 3221, which is aligned with the drainage port 31 to guide the valve core 61 to move in a state of being aligned with the drainage port 31. Specifically, the above guide structure 3221 is a guide groove arranged on the installation bracket 322, which is shaped to match the valve core 61, and a groove opening of the guide groove is aligned with the drainage port 31 to assist the connecting rod assembly in guiding the valve core 61 to move in a state of being aligned with the drainage port 31.

Preferably, the above valve core 61 includes a valve core body 611 and a sealing structure 612 provided on the valve core body 611. In a case where the valve core 61 blocks the drainage port 31, the sealing structure 612 is located inside the drainage port 31 or blocks the water inflow/outflow side of the drainage port 31, so as to close the drainage port 31 and improve the blocking reliability.

Regarding the above, it should be noted that the arrangement of the elastic member 63 and the connection assembly 62 of the drainage valve group 6 of the present disclosure is not limited to the above preferred example, and the specific structure and arrangement of the connection assembly 62 and the elastic member 63 are not limited. For example, the above connection assembly 62 can also be a sliding guide connection structure composed of a slide rail and a slider, and the above elastic member 63 can also be other members with elastic deformation and elastic support requirements, such as spring plates. Even if in case of connecting rod assembly and spring, the arrangement thereof is not limited. For example, when the spring is arranged on an outer side wall of the hole-free inner cylinder 3, the spring can also be compressed and deformed to press the valve core 61 against the water outflow side of the drainage port 31, thereby blocking the drainage port 31. The connecting rod assembly can also be any other connecting rod structure that can meet the guiding requirements, as long as the arrangement of the elastic member 63 and the connecting rod assembly can meet the driving and guiding requirements of the valve core 61.

With continued reference to FIG. 2, for any of the above embodiments, the above drainage valve group 6 preferably further includes a counterweight member 64, which is provided on the connecting rod assembly to increase partial overall mass of the connecting rod assembly, thus partially increasing its inertia. Therefore, when the hole-free inner cylinder 3 rotates for drainage, the action of centrifugal force assists the connecting rod assembly in deformation and movement, thereby urging the valve core 61 to move away from the drainage port 31, strengthening the guiding and pushing effect of the connecting rod assembly on the valve core 61, and optimizing the movement smoothness of the valve core 61 when opening the drainage port 31.

Alternatively, the above counterweight member 64 can also be provided on the valve core 61 to directly increase the inertia of the valve core 61, so that when the hole-free inner cylinder 3 rotates for drainage, the action of centrifugal force further urges the valve core 61 to move away from the drainage port 31, optimizing the movement smoothness of the valve core 61 when opening the drainage port 31.

Hitherto, the technical solutions of the present disclosure have been described in connection with the preferred embodiments shown in the accompanying drawings, but it is easily understood by those skilled in the art that the scope of protection of the present disclosure is obviously not limited to these specific embodiments. Without departing from the principles of the present disclosure, those skilled in the art can make equivalent changes or replacements to relevant technical features, and all the technical solutions after these changes or replacements will fall within the scope of protection of the present disclosure.

The invention claimed is:

1. A washing apparatus, comprising:
an outer cylinder,
an inner cylinder having a cylinder wall without water passing holes,
a drainage valve group, and
a drainage pipe group;
wherein the outer cylinder is communicated with an outside of the washing apparatus through the drainage pipe group;
wherein the inner cylinder is coaxially rotatably arranged inside the outer cylinder, and a drainage port is provided on the cylinder wall of the inner cylinder;
wherein the drainage valve group comprises a connection assembly, an elastic member, and a valve core, and the valve core is connected to the inner cylinder through the connection assembly and the elastic member respectively;
wherein the elastic member is configured to be capable of urging the valve core to maintain a state of blocking the drainage port in non-drainage situations, and to be capable of allowing the valve core to move away from the drainage port by means of a centrifugal force overcoming an elastic force through elastic deformation of the elastic member when the inner cylinder rotates for drainage, thereby opening the drainage port;
wherein the connection assembly is configured to be capable of guiding the valve core to move away from the drainage port in drainage situations, and to be capable of guiding the valve core to move for resetting through a springback action of the elastic member in non-drainage situations,
wherein the connection assembly comprises a connecting rod assembly, and the valve core is connected to the inner cylinder through the connecting rod assembly;
wherein the connecting rod assembly can guide the valve core to move away from the drainage port through expansion/retraction deformation, and can guide the valve core to move toward the drainage port through retraction/expansion deformation for resetting;
wherein the connecting rod assembly is arranged inside the inner cylinder, and the connecting rod assembly comprises first and second symmetrically arranged rod groups, each of which comprises a first connecting rod and a second connecting rod that are pivotally connected;
wherein one end of the first connecting rod of the first rod group that is away from the second connecting rod of the first rod group is pivotally connected to an inner side of the inner cylinder, and one end of the second connecting rod of the first rod group that is away from the first connecting rod of the first group is pivotally connected to the valve core;
wherein one end of the first connecting rod of the second rod group that is away from the second connecting rod of the second rod group is pivotally connected to an inner side of the inner cylinder, and one end of the second connecting rod of the second rod group that is away from the first connecting rod of the second group is pivotally connected to the valve core;
wherein in a case where the valve core moves away from the drainage port, an angle between the first connecting rod and the second connecting rod of each of the first and second rod groups increases to guide the valve core to move toward an outside of the inner cylinder through expansion deformation; and wherein in a case where the valve core moves for resetting, the angle between the first connecting rod and the second connecting rod of each of the first and second rod groups decreases to guide the valve core to move toward the drainage port through retraction deformation for resetting.

2. The washing apparatus according to claim 1, wherein the drainage valve group further comprises a counterweight member, which is arranged on the connecting rod assembly for assisting in deformation movement of the connecting rod assembly under the action of centrifugal force when the inner cylinder rotates for drainage and thus urging the valve core to move away from the drainage port.

3. The washing apparatus according to claim 1, wherein the drainage valve group further comprises a counterweight member, which is arranged on the valve core for urging the valve core to move away from the drainage port under the action of centrifugal force when the inner cylinder rotates for drainage.

4. The washing apparatus according to claim 1, wherein the elastic member is a spring arranged inside the inner cylinder, and two ends of the spring are connected to the inner cylinder and the valve core respectively, so that the spring can allow the valve core to move away from the drainage port through stretching deformation of the spring, and can urge the valve core to move for resetting through contracting and springing back of the spring.

5. The washing apparatus according to claim 1, wherein a guide structure is provided on the inner cylinder, and the guide structure is aligned with the drainage port so that the valve core is guided to move in a state of being aligned with the drainage port.

6. The washing apparatus according to claim 1, wherein an inner side wall of the inner cylinder is provided with a lifting rib, which comprises a shell and water passing holes provided on the shell, and the drainage port is arranged on the side wall of the inner cylinder and covered by the shell; and the connection assembly, the elastic member, and the valve core are all arranged inside the shell, and the valve core is connected to an inner side of the side wall of the inner cylinder through the connection assembly and the elastic member respectively.

7. The washing apparatus according to claim 6, wherein the lifting rib further comprises an installation bracket, which is arranged inside the shell, and the connection assembly and the elastic member are connected to the inner cylinder through the installation bracket.

8. The washing apparatus according to claim 1, wherein the valve core comprises a valve core body and a sealing structure arranged on the valve core body, and the valve core blocks the drainage port through the sealing structure.

* * * * *